(12) United States Patent
Panchal et al.

(10) Patent No.: US 11,449,686 B1
(45) Date of Patent: Sep. 20, 2022

(54) AUTOMATED EVALUATION AND SELECTION OF MACHINE TRANSLATION PROTOCOLS

(71) Applicant: Amazon Technologies, Inc., Seattle, WA (US)

(72) Inventors: Brinda Panchal, Seattle, WA (US); Abhinav Agarwal, Seattle, WA (US); Sandy Barnabas, New York, NY (US); You Ling, New York, NY (US); Pavel Fomitchov, New York, NY (US); Nagaraja Vasudevamurthy, Redmond, WA (US); Kaivan Wadia, New York, NY (US); Emmanuel Addy Lamptey, Monroe, NY (US); Meng Kang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 16/506,354

(22) Filed: Jul. 9, 2019

(51) Int. Cl.
*G06F 40/51* (2020.01)
*G06F 40/58* (2020.01)

(52) U.S. Cl.
CPC .............. *G06F 40/51* (2020.01); *G06F 40/58* (2020.01)

(58) Field of Classification Search
CPC .................................. G06F 40/51; G06F 40/58

USPC ............................................................ 704/2
See application file for complete search history.

(56) References Cited

U.S. PATENT DOCUMENTS

| 1,006,793 | A | 10/1911 | Riethof |
| 8,676,563 | B2 | 3/2014 | Soricut et al. |
| 8,843,359 | B2 | 9/2014 | Lauder |
| 2007/0050182 | A1 | 3/2007 | Sneddon et al. |
| 2017/0169015 | A1 | 6/2017 | Huang |
| 2019/0354593 | A1* | 11/2019 | Rojas ...................... G06F 40/47 |
| 2020/0098352 | A1* | 3/2020 | Feinstein ............... G06N 5/022 |

* cited by examiner

*Primary Examiner* — Thierry L Pham
(74) *Attorney, Agent, or Firm* — Eversheds Sutherland (US) LLP

(57) ABSTRACT

Systems, devices, and methods are provided for using an automated assessment and evaluation of machine translations. A system may receive a request associated with translating first content from a first language to a second language. The system may translate the first content from the first language to the second language. The system may determine an attribute associated with the first content. The system may determine a translation score associated with second content translated from the first language to the second language and associated with the attribute, the translation score indicative of a machine translation accuracy. The system may determine, and based on the translation score, a translation protocol, and may execute the translation protocol.

20 Claims, 8 Drawing Sheets

AUTOMATED EVALUATION AND SELECTION OF MACHINE TRANSLATION PROTOCOLS

BACKGROUND

Content translations are becoming more popular to make content available in different formats and languages. With more requests for content translations in different formats and languages, machine translations may process translation requests to reduce workload on human translators. However, some machine translations may be unreliable given the types of content and languages. Therefore, the processes for translating content may result in errors and poor translations.

Figure 1:
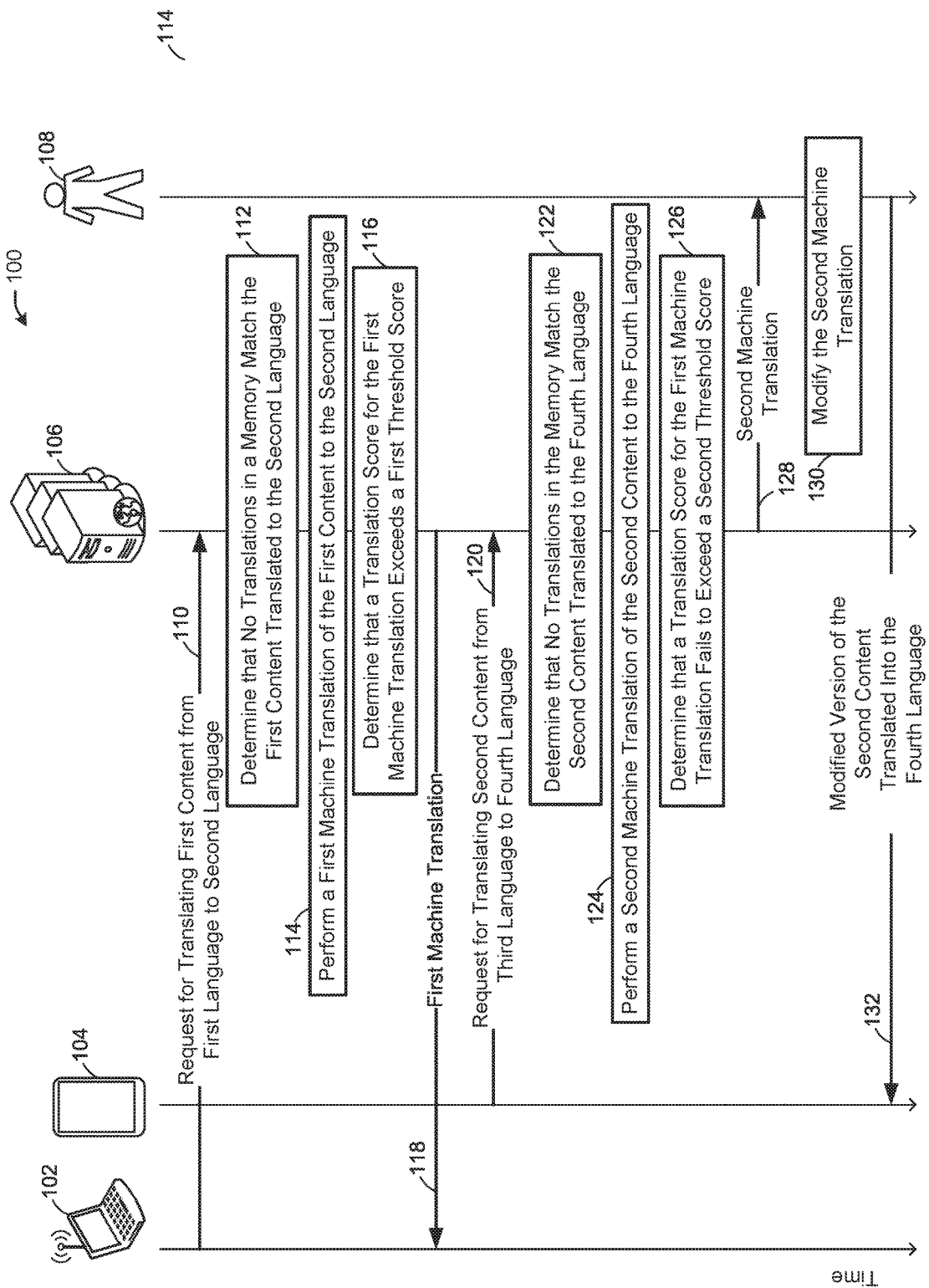
FIG. 1 illustrates an example process for using automated evaluation and selection of machine translation protocols, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using an automated assessment and evaluation of machine translations.

With increases in demand to present content in different regions, demand for adapting content from one language and format to another language and format also has increased. The significant volume of content translation requests may be addressed using machine-based translations, reducing the overall translation workload on human operators. However, not all machine translations may be reliable.

For example, a computer system which may translate content from one language to another language may be limited by the translations and types of content that the machine is programmed to recognize and translate. A computer may not translate to a language for which it has no data. Therefore, machine-based translations may improve as data samples increase. As content translation requests result in content translations, machines may build databases of translated words and phrases from one language to another. However, some language combinations may not have many example translations and data with which a computer may perform a translation from one language to another. For example, some language translations may not be as frequent as other translations, and some words or phrases may be technical, colloquial, terms of art, or otherwise difficult to translate using a word-for-word computer-based translation.

Rather than require all such translations to be performed manually by human operators, and rather than relying in a machine translation that may not be accurate due to the lack of reference data for a machine to use when performing the translation, a translation protocol may be selected based on a recognition of a computer's limitations regarding the translation and based on a balance between using strengths of a computer-based translation and a human-based translation. For example, a translation protocol may refer to a translation workflow that may include any combination of human translations, and/or machine translations. Human translation may include one or multiple translators or translation services, and machine translation may include multiple machine translation engines from which to select.

Therefore, the selection of machine-based translation protocols using varying degrees of machine-based operations may be improved by recognizing situations in which a machine-based translation may satisfy or not satisfy translation quality metrics.

In one or more embodiments, a computer system, such as a computer system including one or more machine learning models, may predict a translation quality of a content translation before or after the content is translated (e.g., using a translation quality score), and may consider the predicted translation quality as a basis for selecting a translation protocol or mode used to perform the translation. The translation protocol or mode may define the levels of machine-based translation and/or human operator-based translation. For example, a machine-based translation which may be considered reliable may be allowed to execute without human operator review, but a machine-based translation which may not be considered reliable may use a hybrid translation model in which a human operator may be called upon to review the machine translation. In this manner, the degree to which computer and human operations may be used for translation processes may depend on a computer's limitations, as recognized by the computer.

In one or more embodiments, a translation quality score may be based on attributes such as a type of content (e.g., a document type—legal, marketing, etc., an advertisement, a headline), words or phrases in content (e.g., content with cultural references, colloquialisms, terms of art, play on words, etc.), images with overlaying text (e.g., difficult to identify and translate), videos without subtitles (e.g., not subtitles available for use in translation), length of content (e.g., number of sentences or words), keywords, brand names, customer sentiments regarding the content or a related brand, a category of a product represented by the content, and the like. When a translation score indicates that a machine-based translation is likely to be accurate and reliable (e.g., when a translation quality score exceeds one or more threshold scores), a purely machine-based translation may be used without requiring human operator review. When a translation score indicates that a machine-based translation is unlikely to be accurate and reliable (e.g., when a translation score fails to exceed one or more threshold scores), the machine-based translation may require some level of human operator review. For example, the type and level of human operator review may be based on the translation score (e.g., multiple operator reviews, reviews for grammar or spelling only, review for particular localized or technical words or phrases, etc.).

In one or more embodiments, a computer system relying on one or more machine learning models may determine when a machine-based translation requires human operator review, and to what degree. The computer system may build a translation memory to store commonly used terms, phrases, re-used content, etc. When the computer system receives a request for a content translation from a first language to a second language (or to multiple other languages), the computer system may access the translation memory to determine if the same content has been translated already from the first language to the second language (e.g., whether the requested content has already been translated into the requested language). When a translation in the translation memory matches (e.g., uses the exact same words) content to be translated, the existing translation from the translation memory may be used (e.g., may serve as the output translation). When content to be translated does not have a match in the translation memory, the computer system may evaluate the content for the likelihood that a computer-based translation will be accurate and reliable.

In one or more embodiments, the translation memory may store translated content along with machine translation quality metrics, such as metrics indicating the level of accuracy that a human operator judged a computer-based translation to be. For example, when reviewing a computer-based translation, a human operator may assign a translation score indicative of the translation quality. A low score (e.g., 1) may indicate that a translation has nothing to do with the source (e.g., the content requested to be translated), and a high score (e.g., 6) may indicate that a machine-based translation is perfect.

In one or more embodiments, when a computer system is to translate content, the computer system may determine whether any matching content in the translation memory is found. An exact match of previously translated content may be used as the output of a translation request. Previously translated content may be evaluated to ensure that it was accurate before use. For example, matching content in the translation memory having a score exceeding a score threshold may be reliable to use in a machine-based translation. Matching content in the translation memory having a score below a score threshold may not be reliable to use in a machine-based translation, thereby triggering a full translation using any combination of machine-based translation and human-based translation based on attributes of the content to be translated. The thresholds may be adjusted based on whether the results were positive or negative. For example, when a machine translation is selected from the translation memory and proves to be accurate (e.g., the translation score of a review of the translated content is higher than a score threshold), the threshold score may be adjusted lower. When a machine translation is selected from the translation memory and proves to be inaccurate (e.g., the translation score of a review of the translated content is lower than a score threshold), the threshold score may be adjusted higher. Thresholds also may be based on the type of content. For example, technical or legal content may require higher scrutiny than other types of content, so some content types may use a higher score threshold to ensure that only high-quality translations are used. Shorter content may be more likely to meet a quality threshold, so a threshold may be set higher or lower based on the length of content to be translated and/or the matching content.

In one or more embodiments, to build the translation memory and evaluate the quality of machine-based translations, human operators may review machine translations even when a translation mode or process calls for use of a purely machine-based translation. To evaluate purely machine-based translations for their accuracy—thereby impacting whether those machine-based translations are selected subsequently for reuse—human operators may audit select machine-based translations. The selected machine-based translations for human review may be random, or may be based on number of every N translations, based on the type of content, the length of the content, the highest score of matching or similar content in the translation memory, or other factors. The human operators may provide quality scores as described above to indicate whether a machine-based translation is of high or low quality. A translation edit rate (TER) may be the minimum number of edits needed to change a machine translation output to match a reference translation. The higher the TER, the lower the quality score, for example. A human review of a machine-based translation in a machine-only mode may be not prevent the machine translation from being used as the translation output, but may indicate that the translation may or may not be reliable for subsequent use.

In one or more embodiments, to build the translation memory and evaluate the quality of machine-based translations, the computer system may perform computer-based evaluations of machine translations using one or more metrics (e.g., word error rate (WER), bilingual evaluation understudy (BLEU), machine translation output (METEOR), etc.). The metrics may evaluate the differences between machine translation text and reference text in the target (e.g., requested translation) language. The reference text may be selected from the translation memory when the reference text has a high enough quality score. The machine quality score and/or the TER score may be used in any combination to provide one or more scores regarding the quality of translated content in the translation memory.

In one or more embodiments, after machine translation has been performed (e.g., because there is no matching translation or the matching translation was determined to be inaccurate), the computer system may select the translation mode or protocol indicative of an amount and/or type of human operator review. When the computer system determines that the machine translation is likely to be accurate, the computer system may select a translation mode or protocol that does not require human operator review. When the computer system determines that the machine translation is unlikely to be accurate, the computer system may select a translation mode that requires some level or type of human operator review. In this manner, the computer system may determine when to involve human operators without losing the benefits of using machine translation, and without sacrificing accuracy by relying solely on machine translation in some circumstances.

In one or more embodiments, the computer system may receive feedback from content providers, content viewers, or other parties indicating the quality of a translation. The quality score of translated content stored in the translation memory may be based on the feedback provided by one or more parties.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for using automated evaluation and selection of machine translation protocols, in accordance with one or more example embodiments of the present disclosure.

Referring to FIG. 1, the process 100 may include a user device 102 and a user device 104 communicating with a remote computing network 106 (e.g., one or more cloud-based networks and/or devices). A human operator 108 may be available to participate in the process 100 depending on a selected translation protocol. At step 110, the user device 102 may send a request to the remote computing network 106. The request may include first content in a first language, and an indication of a second language (e.g., a different language or dialect) to which to translate the first content. At step 112, the remote computing network 106 may determine that there are no matching translations in a memory (e.g., a translation memory storing previous translations) of the first content translated to the second language as requested, or that any matching translation may have a score failing to exceed a threshold score (e.g., indicative that the matching translation may have been determined to be unreliable). At step 114, the remote computing network 106 may perform a first machine translation (e.g., an automated computer-based translation) of the first content from the first language to the second language.

Still referring to FIG. 1, the remote computing network 106 may, at step 116 determine that a translation score of the first machine translation exceeds a first threshold score (e.g., an estimated score indicating whether the machine translation is likely to be accurate). To determine whether the machine translation is likely to be accurate, the remote computing network 106 may identify similar previously translated content and determine whether the translation score of the previously translated content indicates that the previously translated content was evaluated and determined to be accurate. In this manner, the remote computing network 106 may predict the accuracy of the first machine translation by determining whether similar previously translated content was accurately translated. For example, the remote computing network 106 may have access to previously translated content in different languages, and may identify content that was translated from the first language to the second language. The remote computing network 106 may identify that the first content is a first type of content (e.g., a legal document, a marketing document, e-book content, text, image data, video data, advertisement/promotional content, etc.), and may identify previously translated content from the first language to the second language sharing the same content type and/or sharing one or more attributes with the first content. For example, the remote computing network 106 may identify content attributes using feature extraction processes to determine a length of the first content (e.g., the number of words or sentences), keywords (e.g., matching words in a database or other storage), key phrases, colloquial or local expressions for a given geographic area, products and product types represented by the first content, product brand names represented by the first content, image data in images or video of the first content, and the like. The first similar content may have been translated from the first language to the second language, and a combination of automated and/or human review of the translation may be used for determining the translation quality score. The translation quality score may indicate how accurate the translation of the first similar content was. At step 118, because the translation quality score for the first machine translation exceeded the first threshold score, the remote computing network 106 may send the first machine translation of the first content translated into the second language to the user device 102.

Still referring to FIG. 1, at step 120, the user device 104 may send a request to translate second content from a third language to a fourth language (e.g., either language may be the same as one of the first or second languages, or different languages). At step 122, the remote computing network 106 may determine that there are no matching translations in a memory (e.g., a translation memory storing previous translations) of the second content translated to the fourth language as requested, or that any matching translation may have a score failing to exceed a threshold score (e.g., indicative that the matching translation may have been determined to be unreliable). At step 124, the remote computing network 106 may translate the second content to the fourth language using a machine translation process. At step 126, the remote computing network 106 may determine that the translation score of the second machine translation fails to exceed a second threshold score (e.g., either the same as the first threshold score or a different threshold). Similar to step 116, the remote computing network may identify previously translated content similar to the second content based on content type and/or attributes. Because the translation score of the second machine translation did not exceed the second threshold score, the remote computing network 106 may send the second machine translation of the second content in the fourth language to the human operator 108 for an editing review. At step 130, the human operator 108 may review the second machine translation and make modifications to ensure accuracy of the second machine translation. At step 132, the human operator 108 may send the modified version of the second machine translation of the second content in the fourth language to the user device 104. In this manner, both purely machine-only translation protocols and machine plus human translation protocols may be implemented based on the ability of the remote computing network 106 to recognize whether its machine translation of content is likely to be accurate.

In one or more embodiments, the user device 102 and the user device 104 may include any suitable processor-driven device including, but not limited to, a mobile device or a non-mobile (e.g., a static) device. For example, the user device 102 and the user device 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

In one or more embodiments, when the remote computing network 106 finds matching previously translated content for a given content request, the remote computing network 106 may use that matching content as the output of the translation request instead of having to perform a machine translation and determine a level of human operator review for the machine translation.

Figure 2:
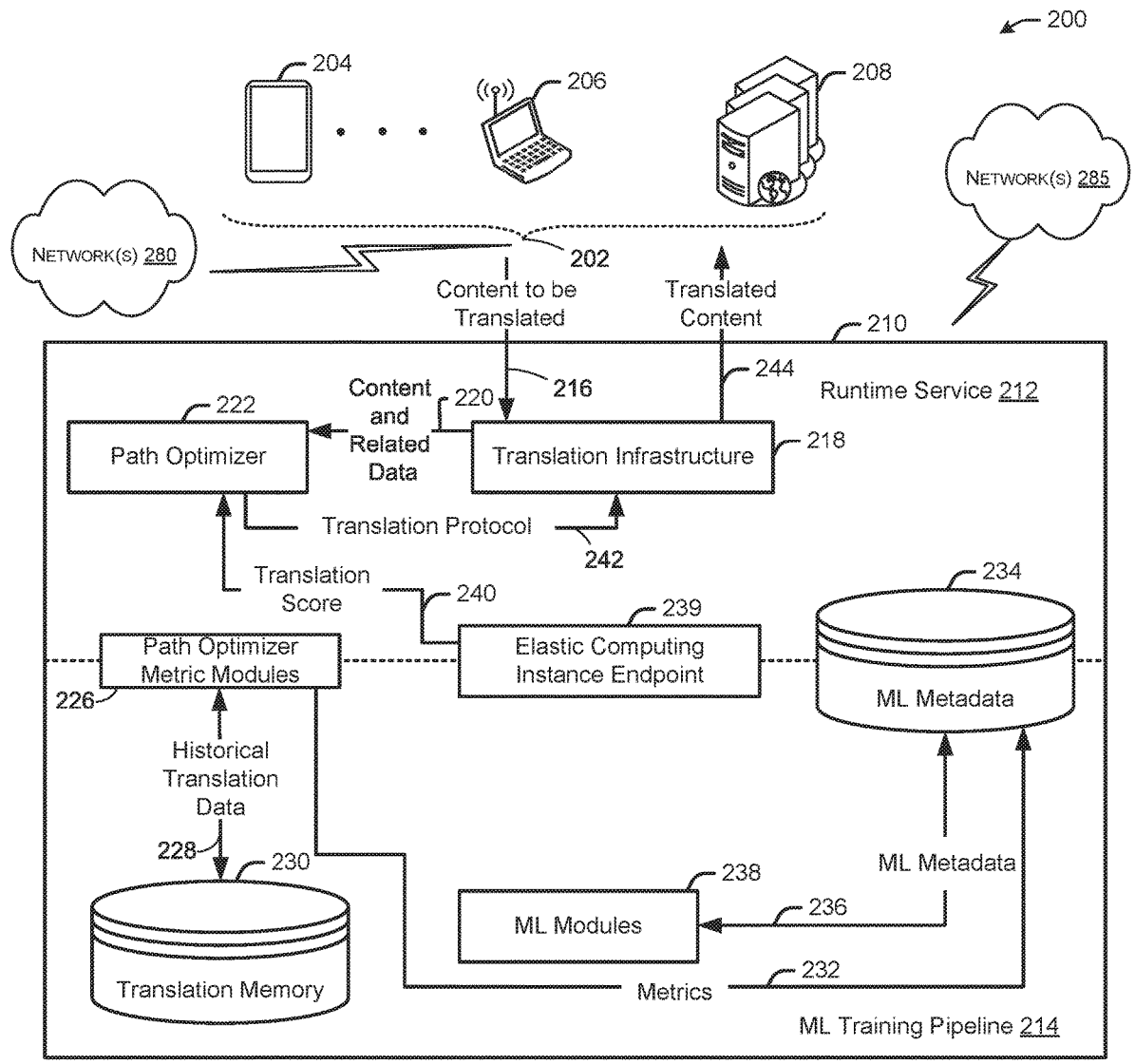
FIG. 2 illustrates an example system for using automated evaluation and selection of machine translation protocols, in accordance with one or more example embodiments of the present disclosure.

FIG. 2 illustrates an example system 200 for using automated evaluation and selection of machine translation protocols, in accordance with one or more example embodiments of the present disclosure.

Referring to FIG. 2, the system 200 may include one or more devices 202, which may include user device 204, user device 206, and one or more servers 208. The one or more devices 202 may access a remote computing network 210 (e.g., a cloud computing system), which may host remote computing resources and services. The remote computing network may include multiple services, resources, and components, such as a runtime service 212 (e.g., executable code or scripts providing runtime services such as initialization, launching client sessions, facilitating access to services, etc.) and a machine learning (ML) training pipeline (e.g., to train one or more machine learning modules). The one or more devices 202 may send a request to the remote computing network 210 for content to be translated 216. The request and the content to be translated 216 may be received by translation infrastructure 218, which may provide translation services for multiple language pairs (e.g., from a first language to a second language). The translation infrastructure 218 may perform a machine translation of the content to be translated 216 using rule-based translation, interlingual machine translation, transfer-based machine translation, dictionary based translation, statistical-based translation, or other translation methods.

Still referring to FIG. 2, the translation infrastructure 218 may provide content and related data 220 (e.g., source text—the content to be translated 216, the machine translation text, an indication of the content type, language pair, etc.) to a path optimizer 222, which may include a service that determines the translation protocol to use. One or more path optimizer metric modules 226 may include serverless computing functions to execute in the remote computing network 210, and may request and receive historical translation data 228 from a translation memory 230 (e.g., one or more databases or other storage). The translation memory may store historical translation data 228, such as machine translations (edited and/or unedited by human operators), data indicating language pairs used in respective translations, attribute information, content type information for translations, and scores indicating how accurate a translation was (e.g., based on a comparison with one or more reference documents of a given language). The one or more path optimizer modules 226 may write ML model performance metrics 232 to a ML metadata database 234 or other storage. The ML model performance metrics 232 may include scores indicating how accurate machine translations in the translation memory 230 are. The ML metadata database 234 may exchange ML metadata 236 with one or more ML modules 238, which may build (e.g., collect and prepare training data), train (e.g., establish and manage training environments and infrastructure using elastic computing instances and graphics processing units provided by the remote computing network 210), deploy machine learning models (e.g., deploy using elastic computing instances in the remote computing network 210, and select and optimize ML algorithms. For example, initial training data may include human reviews of human translations (e.g., when no samples for a language pair exist).

Still referring to FIG. 2, the one or more ML modules 238 may start an inference container at an elastic computing instance endpoint 239, which may provide a machine translation quality estimation, such as a translation score 240, to the path optimizer 222. Based on the translation score 240 of a machine translation (e.g., content having one or more shared attributes with and/or a same content type of the content to be translated 216), the path optimizer may determine whether the translation score 240 exceeds a score threshold and is therefore reliable enough for selection of a translation protocol 242 not requiring a human operator review (e.g., using only the machine translation), or whether a translation protocol 242 including a human operator review of the machine translation is appropriate. The path optimizer 222 may select a translation protocol and may send the translation protocol 242 (or an indication of the protocol) to the translation infrastructure 218. The translation infrastructure 218 may send the translated content 244 to the one or more devices 202. The translated content 244 may be the machine translation with no human review when the translation score 240 exceeds a score threshold, and may be a machine translation with human review edits when the translation score fails to exceed a score threshold.

Any of the communications networks 280 and/or 285 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 280 and/or 285 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 280 and/or 285 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
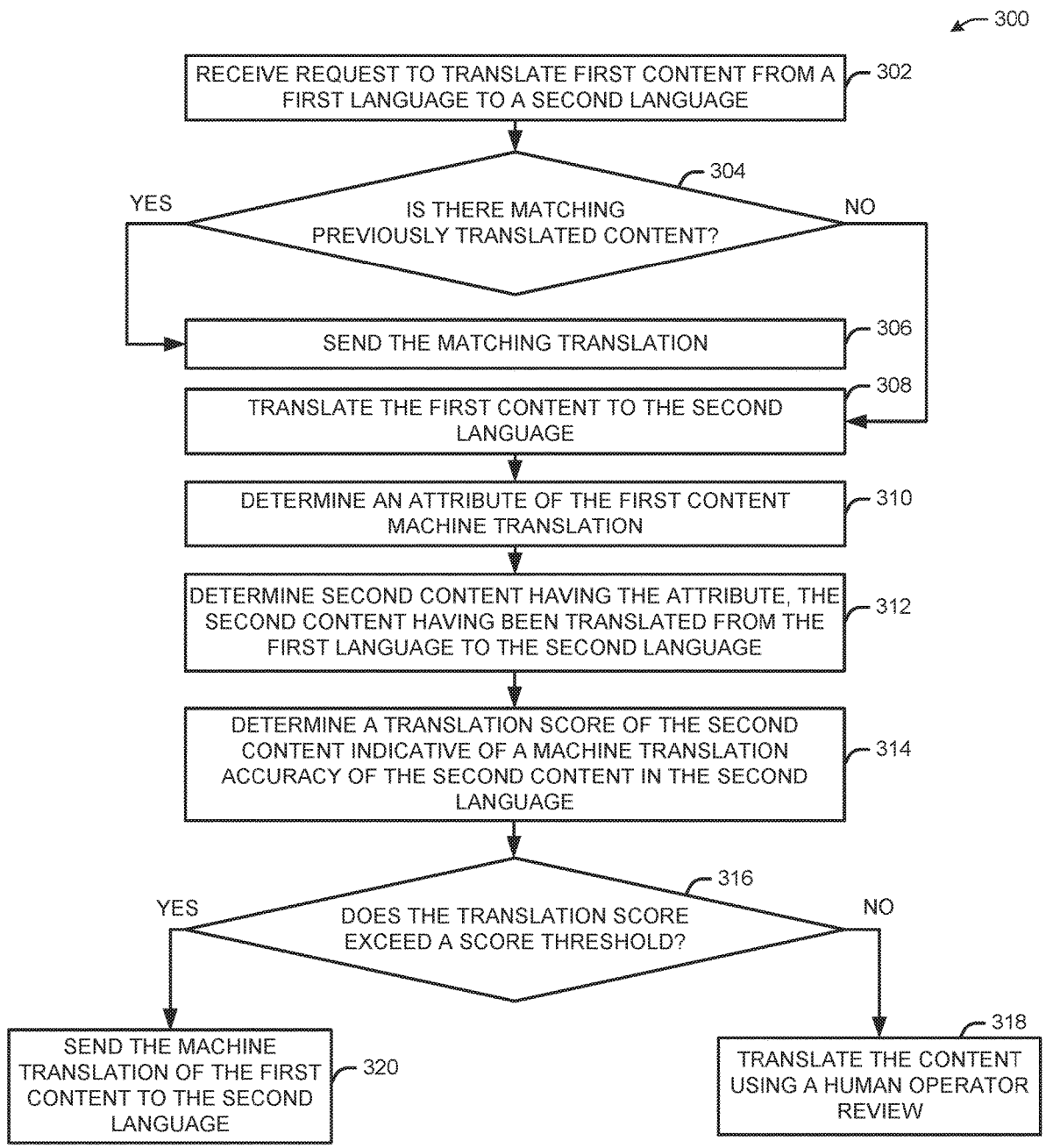
FIG. 3 illustrates an example process for using automated evaluation and selection of machine translation protocols, in accordance with one or more example embodiments of the present disclosure.

FIG. 3 illustrates an example process 300 for using automated evaluation and selection of machine translation protocols, in accordance with one or more example embodiments of the present disclosure.

At step 302, a system (e.g., the remote computing network 106 of FIG. 1, the remote computing network 210 of FIG. 2) may receive a request to translate first content (e.g., source content such as the content to be translated 216 of FIG. 2) from a first language to a second language (e.g., a language pair). The request may include the content and the language pair, or the system may identify the initial language (e.g., the first language) based on analysis of the content, including word or phrase recognition, image analysis, and the like. The content may be of a particular type (e.g., legal, marketing, technical, document, image, video, advertisement/promotion, etc.).

At block 304, the system may determine if any matching translations (e.g., matching previously translated content) is available (e.g., from the translation memory 230 of FIG. 2). The system may identify previously translated content by matching the exact words from the first content to the exact words of the source content that was used in the matching translation (e.g., the source content may be stored in the translation memory 230). When a matching translation exists (e.g., the requested first content has already been translated to the second language), the process 300 may proceed to block 306, where the system may send or present the matching translation as the output of the translation request. When a matching translation does not exist (or when a matching translation has a translation score below a threshold score), the process 300 may continue to block 308.

At block 308, the system may translate the first content to the second language using one or more machine translation techniques as described above. The result may be a machine translation of the first content in the second language. When the language pair has a threshold amount of sample translations from past translations, the translation may be a machine translation. When the language pair has never been used, a human translation may be performed and used as ground truth in training one or more ML models (e.g., the one or more ML modules 238 of FIG. 2). The system may select from among multiple machine translation options based on evaluations of past performance (e.g., translation score of content using a machine translation model), based on cost or time (e.g., how long the machine translation has been estimated to take to perform the translation given the language pair and similar attributes), and/or specified user preferences.

At block 310, the system may determine an attribute of the first machine translation and/or a type of the first machine translation. The attribute may include a number of words or sentences (e.g., indicating the length of the content), keywords or phrases, product types/categories, brand names, product reviews/feedback (e.g., indicating user sentiments regarding the content), and other types of attributes. The system may analyze the machine translation for attributes using textual, image, video, or other analysis to identify certain words (e.g., matching words, image analysis techniques), the number of words or sentences, products/ brands (e.g., by textual or image analysis), and other methods of attribute recognition. The content type may be determined based on the type of document or file associated with the machine translation (e.g., file extensions, application programming interfaces used to transmit the translation request, etc.), analysis of words in the machine translation, and other methods. The attribute may be used to identify previously translated content with similarities to the machine translation, and the system may evaluate the previously translated content to determine whether the machine translation is likely to be accurate.

At block 310, the system may determine previously translated content (e.g., in the translation memory 230 of FIG. 2) having one or more of the same attributes of the machine translation. Previously translated content may be stored with one or more translation scores indicating the accuracy of the previously translated content, and with attribute and content type information. The system may identify attributes and content type stored with previously translated content (e.g., using one or more identifiers of an attribute or content type), and may determine whether previously translated content shares the attribute or content type of the machine translation. When the machine translation does not share attributes of any previously translated content, the process 300 may require human operator review of the machine translation as described further below. When the machine translation shares attributes with any previously translated content, the process 300 may continue to block 312, where the system may determine the second content (e.g., the previously translated content sharing one or more attributes with the machine translation).

At block 314, the system may determine the translation score of the second content. At block 316, the system may determine whether the translation score of the second content exceeds a threshold score, which may be adjusted based on whether content of the content type and/or having the attribute(s) was scored as accurate in previous translations. The threshold may be based on the attribute and/or content type (e.g., some attributes or content types may indicate more difficult translations, and may use a higher threshold to ensure that machine translations are reviewed by human operators unless the translations are of significantly high quality). When the translation score fails to exceed a score threshold, the system may proceed to block 318, where the system may select a translation protocol in which the system translated the content using a machine translation and prompts a human operator review. The translation protocol using human operator review may include any combination of multiple protocols which may include human operator reviews. For example, the number of human operators, the specific reviewers/vendors, the thoroughness of the review, the timeline for review, the cost for review, and other factors may be considered when selecting a translation protocol with human operator review. For example, the system may select human operators that are more cost efficient, time efficient, and/or have been more accurate translating content with similar attributes/language pairs.

When the translation score exceeds the score threshold, the system may, at block 320, use a translation protocol relying on the machine translation from block 308 as the output translation to the requester.

Figure 4:
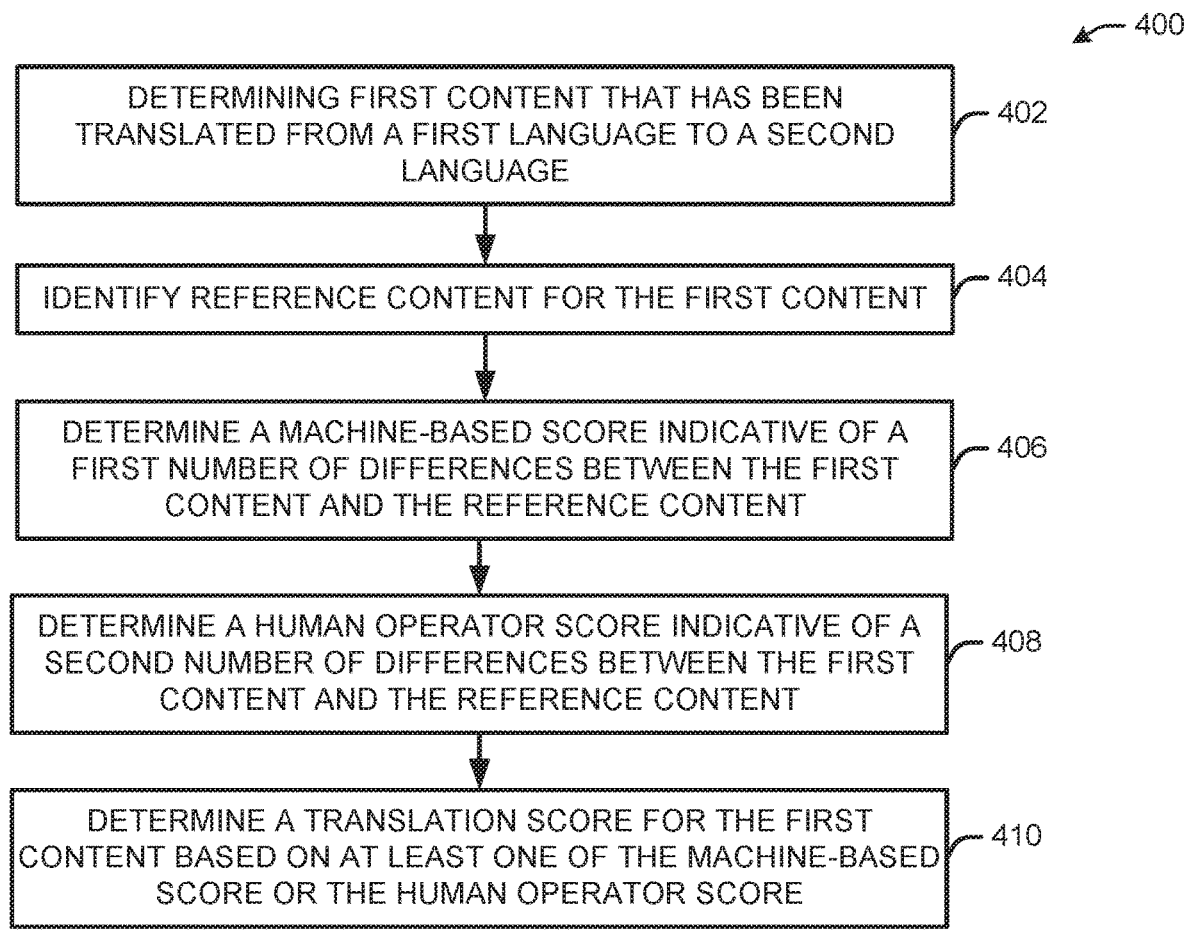
FIG. 4 illustrates an example process for using automated evaluation and selection of machine translation protocols, in accordance with one or more example embodiments of the present disclosure.

FIG. 4 illustrates an example process 400 for using automated evaluation and selection of machine translation protocols, in accordance with one or more example embodiments of the present disclosure.

At block 402, a system (e.g., the remote computing network 106 of FIG. 1, the remote computing network 210 of FIG. 2) may determine that first content has been translated from a first language to a second language (e.g., was translated according to a language pair). The system may identify previously translated content using a translation protocol, and may evaluate whether the translated content was accurate.

At block 404, the system may identify reference content for the first content. A reference content for the first content may be any content translation available using the same language pair, sharing a content type and/or attribute, or a selected content translation. The reference content may be stored in the same location (e.g., the translation memory 230 of FIG. 2) or may be stored separately. The reference content may be selected based on the translation score of the reference content exceeding a threshold score.

At block 406, the system may determine a machine-based score for the first content. The machine-based score may use automatic evaluation metrics such as WER, BLEU, and/or METEOR, and may indicate the quality of the translation of the first content in the second language based on the number of differences between the first content and the reference content.

At block 408, the system may determine a human operator score for the first content. The human operator score may be based on a transmission edit rate defined as the minimum number of edits required to change the machine translation of the first content to match a reference content translation. Block 406 and block 408 may be performed in any order, or only one may be performed.

At block 410, the system may determine a translation score for the first content based on at least one of the machine-based score or the human operator score. When only one of the machine-based score or the human operator score are determined, that score may be the translation score for the first content (e.g., the translation score of block 314 of FIG. 3). When both scores are determined, the system may use the highest or lowest score, or an average or mean of the scores. For example, a translation score may indicate that a machine translation has nothing to do with the source content (e.g., lowest score); that some words of a machine translation are understandable, but the overall meaning is lost; that most words of a machine translation are understandable, but the main meaning is lost; that the meaning of a machine translation is essentially preserved, but the translation has mechanical errors; that a machine translation meaning is fully preserved without errors, but the translation is not from a professional/reputable/selected translator service; or that a machine translation is perfect as if from a professional/reputable/selected translator.

Figure 5A:
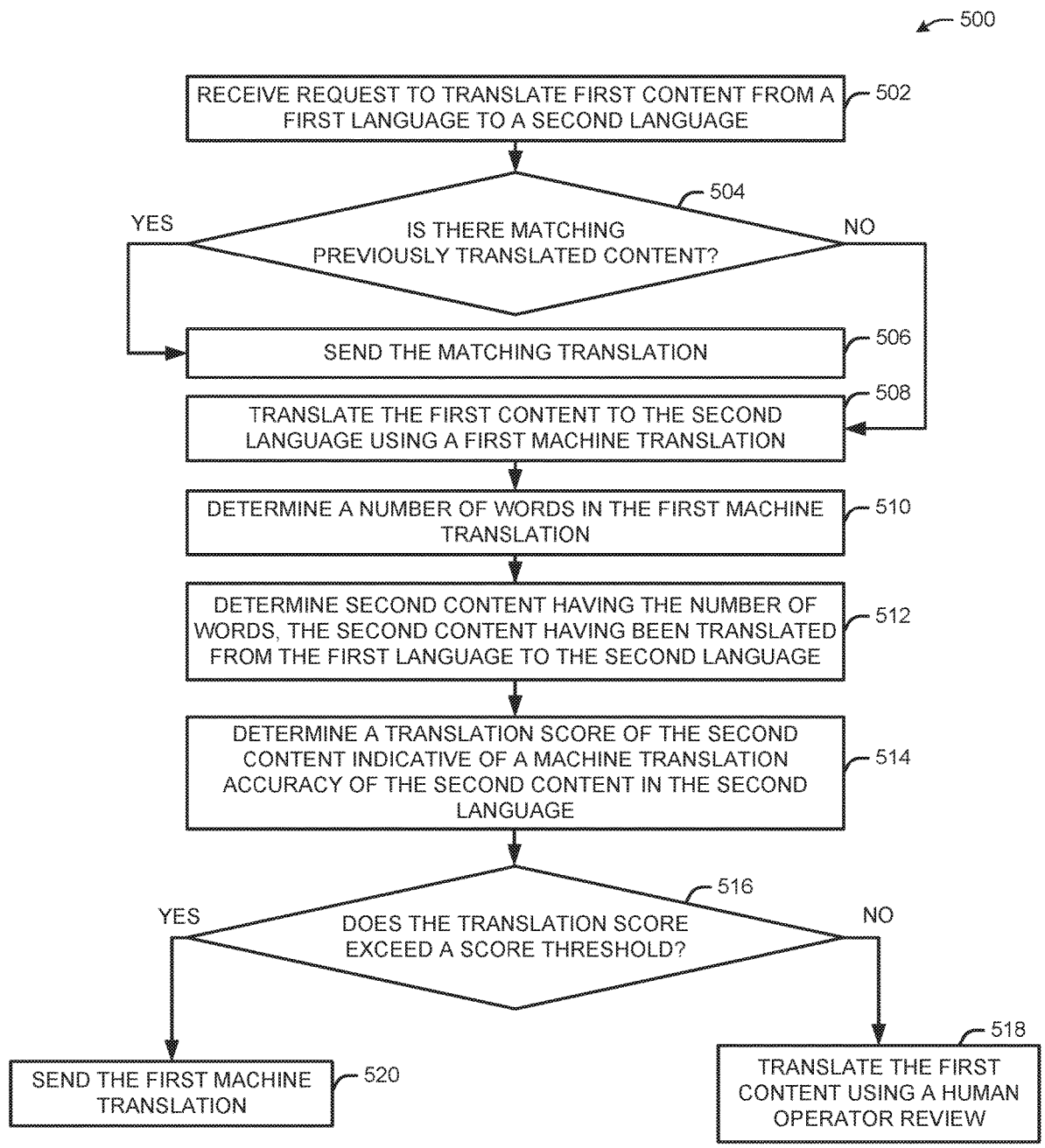
FIG. 5A illustrates an example process for using automated evaluation and selection of machine translation protocols, in accordance with one or more example embodiments of the present disclosure.

FIG. 5A illustrates an example process 500 for using automated evaluation and selection of machine translation protocols, in accordance with one or more example embodiments of the present disclosure.

At block 502, a system (e.g., the remote computing network 106 of FIG. 1, the remote computing network 210 of FIG. 2) may receive a request to translate first content (e.g., source content such as the content to be translated 216 of FIG. 2) from a first language to a second language (e.g., a language pair). The request may include the content and the language pair, or the system may identify the initial language (e.g., the first language) based on analysis of the content, including word or phrase recognition, image analysis, and the like. The content may be of a particular type (e.g., legal, marketing, technical, document, image, video, advertisement/promotion, etc.).

At block 504, the system may determine if any matching translations (e.g., matching previously translated content) is available (e.g., from the translation memory 230 of FIG. 2). The system may identify previously translated content by matching the exact words from the first content to the exact words of the source content that was used in the matching translation (e.g., the source content may be stored in the translation memory 230). When a matching translation exists (e.g., the requested first content has already been translated to the second language), the process 500 may proceed to block 506, where the system may send or present the matching translation as the output of the translation request. When a matching translation does not exist (or when a matching translation has a translation score below a threshold score), the process 500 may continue to block 508.

At block 508, the system may translate the first content to the second language using one or more machine translation techniques as described above. The result may be a machine translation. When the language pair has a threshold amount of sample translations from past translations, the translation may be a machine translation. When the language pair has never been used, a human translation may be performed and used as ground truth in training one or more ML models (e.g., the one or more ML modules 238 of FIG. 2). The system may select from among multiple machine translation options based on evaluations of past performance (e.g., translation score of content using a machine translation model), based on cost or time (e.g., how long the machine translation has been estimated to take to perform the translation given the language pair and similar attributes), and/or specified user preferences.

At block 510, the system may determine a number of words or sentences in the machine translation to determine how long the machine translation is, and how long the machine translation may require to analyze and translate. The system may analyze text of the machine translation if the source content is in a document or if the source content is submitted text. The system may analyze images and/or video to extract words using image analysis techniques with object detection, for example. Once words are identified, the system may determine how many words are in or represented by the machine translation.

At block 512, the system may determine whether any second (e.g., previously translated) content has the same number of words as the machine translation. The system may identify previously translated content (e.g., block 402 of FIG. 4), and may analyze the previously translated content or may use stored metadata for the translated content indicating the content length. The previously translated content may be identified by the system matching the language pair of the first content with the same language pair of the previously translated content as stored with the matching content. Previously translated content also may share a content type with the first content. A request for a content translation may identify the previously translated content to use. When no previously translated content has the same number of words as the machine translation, the process 500 may rely on a human operator translation protocol as explained further below. When the previously translated content has the same number of words as the machine translation, the process 500 may proceed to block 514.

At block 514, the system may determine the translation score of the second content. The translation score may be based on FIG. 4, for example, and the translation score may indicate whether a post-translation review of the previously translated content (e.g., second content) indicates whether the previous translation was accurate. At block 516, the system may determine whether the translation score of the second content exceeds a threshold score, which may be adjusted based on whether content of the content type and/or having the attribute(s) was scored as accurate in previous translations. The threshold may be based on the attribute and/or content type (e.g., some attributes or content types may indicate more difficult translations, and may use a higher threshold to ensure that machine translations are reviewed by human operators unless the translations are of significantly high quality). When the translation score fails to exceed a score threshold, the system may proceed to block 518, where the system may select a translation protocol in which the system translated the content using a machine translation and prompts a human operator review. The translation protocol using human operator review may include any combination of multiple protocols which may include human operator reviews. For example, the number of human operators, the specific reviewers/vendors, the thoroughness of the review, the timeline for review, the cost for review, and other factors may be considered when selecting a translation protocol with human operator review.

When the translation score exceeds the score threshold, the system may, at block 520, use a translation protocol relying on the machine translation from block 508 as the output translation to the requester.

Figure 5B:
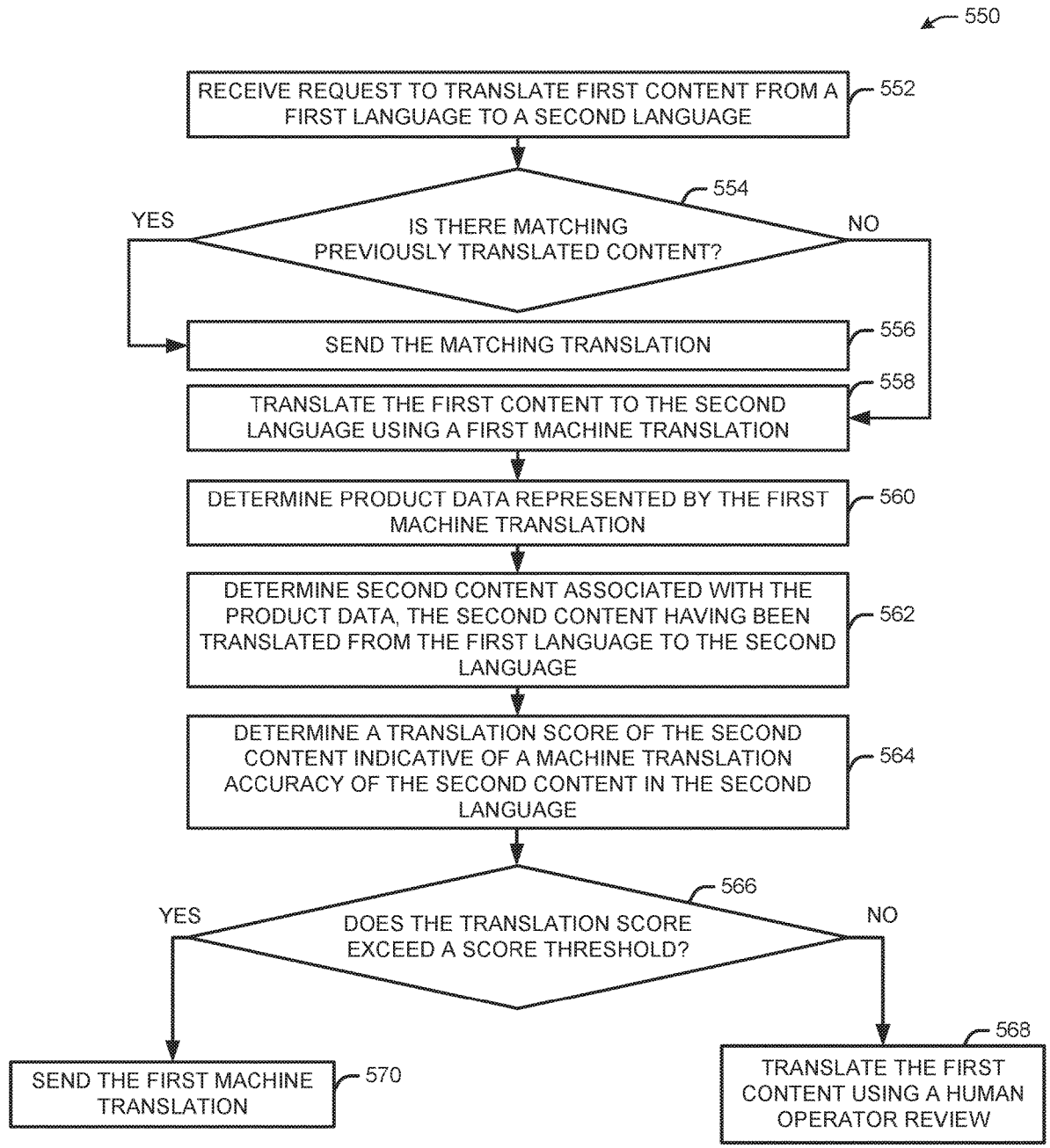
FIG. 5B illustrates an example process for using automated evaluation and selection of machine translation protocols, in accordance with one or more example embodiments of the present disclosure.

FIG. 5B illustrates an example process 550 for using automated evaluation and selection of machine translation protocols, in accordance with one or more example embodiments of the present disclosure.

At block 552, a system (e.g., the remote computing network 106 of FIG. 1, the remote computing network 210 of FIG. 2) may receive a request to translate first content (e.g., source content such as the content to be translated 216 of FIG. 2) from a first language to a second language (e.g., a language pair). The request may include the content and the language pair, or the system may identify the initial language (e.g., the first language) based on analysis of the content, including word or phrase recognition, image analysis, and the like. The content may be of a particular type (e.g., legal, marketing, technical, document, image, video, advertisement/promotion, etc.).

At block 554, the system may determine if any matching translations (e.g., matching previously translated content) is available (e.g., from the translation memory 230 of FIG. 2). The system may identify previously translated content by matching the exact words from the first content to the exact words of the source content that was used in the matching translation (e.g., the source content may be stored in the translation memory 230). When a matching translation exists (e.g., the requested first content has already been translated to the second language), the process 550 may proceed to block 556, where the system may send or present the matching translation as the output of the translation request. When a matching translation does not exist (or when a matching translation has a translation score below a threshold score), the process 550 may continue to block 558.

At block 558, the system may translate the first content to the second language using one or more machine translation techniques as described above. The resulting translation may be a machine translation. When the language pair has a threshold amount of sample translations from past translations, the translation may be a machine translation. When the language pair has never been used, a human translation may be performed and used as ground truth in training one or more ML models (e.g., the one or more ML modules 238 of FIG. 2). The system may select from among multiple machine translation options based on evaluations of past performance (e.g., translation score of content using a machine translation model), based on cost or time (e.g., how long the machine translation has been estimated to take to perform the translation given the language pair and similar attributes), and/or specified user preferences.

At block 560, the system may determine product data represented by the machine translation. For example, the system may identify a product, product type, and/or product brand name by analyzing text or image data of the machine translation. The system may match product names or related terms to text identified using textual and/or image object recognition of the machine translation. Product data may include product reviews or feedback received from other sources, such as product sentiments provided by viewers of the machine translation or other content associated with the product, product type, and/or product brand name.

At block 562, the system may determine whether any second (e.g., previously translated) content represents the product data of the machine translation. The system may identify translated content (e.g., from the translation memory 230 of FIG. 2) based on a same content type and/or language pair of the machine translation. The translated content may be stored with identifiers of a product, product type, and/or product brand name. By matching one or more of the identifiers from the machine translation (e.g., the recognized product, product type, and/or product brand name may correspond to respective identifiers), the system may determine whether any previously translated content also represents the product data of the machine translation. If not, the process 550 may rely on a human operator translation protocol as explained further below. If so, the process 550 may proceed to block 564.

At block 564, the system may determine the translation score of the second content. The translation score may be the score of the previously translated content based on one or more evaluations of the previously translated content. At block 566, the system may determine whether the translation score of the second content exceeds a threshold score, which may be adjusted based on whether content of the content type and/or having the attribute(s) was scored as accurate in previous translations. The threshold may be based on the attribute and/or content type (e.g., some attributes or content types may indicate more difficult translations, and may use a higher threshold to ensure that machine translations are reviewed by human operators unless the translations are of significantly high quality). When the translation score fails to exceed a score threshold, the system may proceed to block 570, where the system may select a translation protocol in which the system translated the content using a machine translation and prompts a human operator review. The translation protocol using human operator review may include any combination of multiple protocols which may include human operator reviews. For example, the number of human operators, the specific reviewers/vendors, the thoroughness of the review, the timeline for review, the cost for review, and other factors may be considered when selecting a translation protocol with human operator review. A translation protocol that is the fastest (e.g., shortest time) and/or lowest cost may be selected, or the best quality translation protocol for a given language pair and/or attribute may be selected.

When the translation score exceeds the score threshold, the system may, at block 570, use a translation protocol relying on the machine translation from block 558 as the output translation to the requester.

Figure 5C:
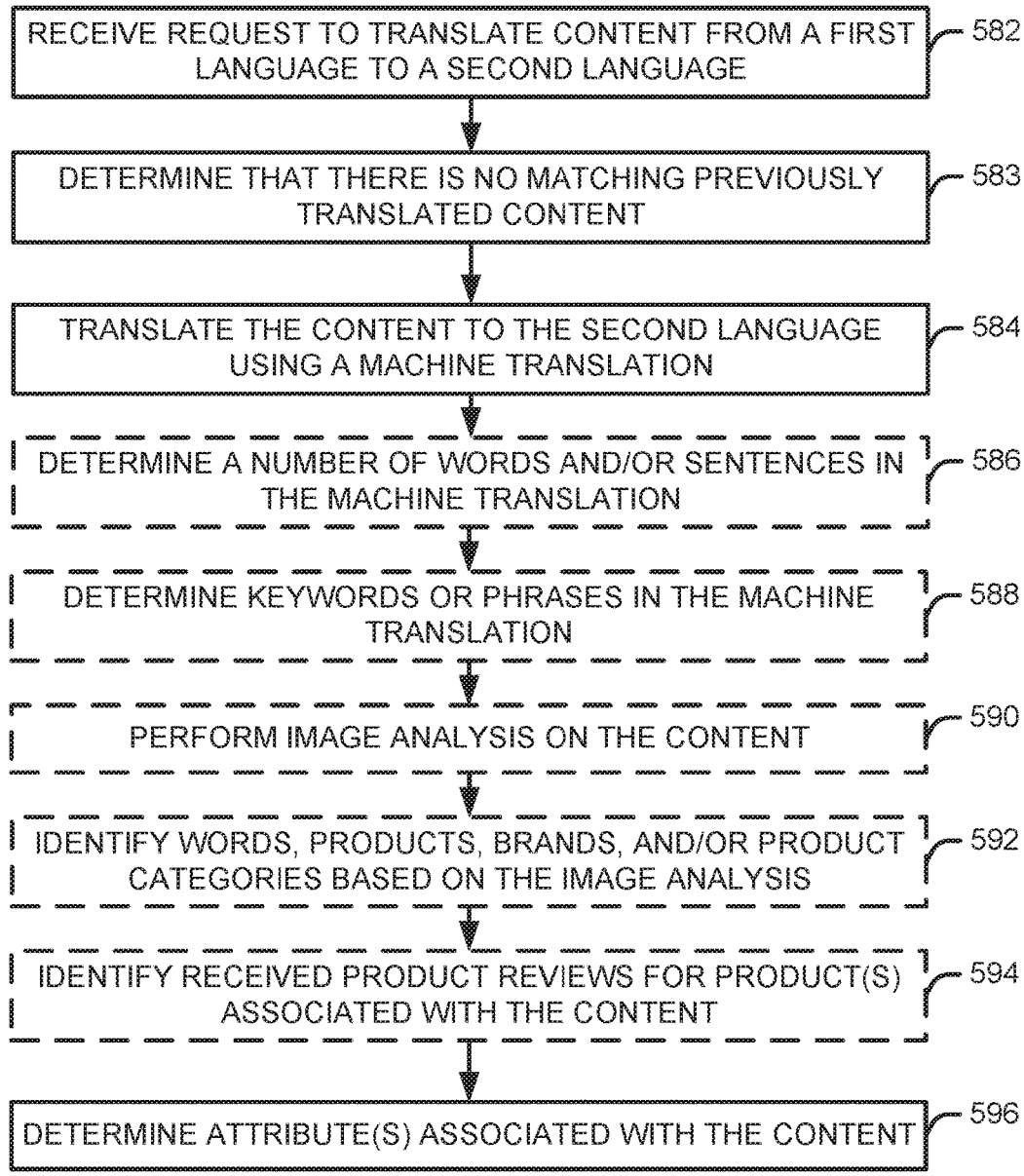
FIG. 5C illustrates an example process for using automated evaluation and selection of machine translation protocols, in accordance with one or more example embodiments of the present disclosure.

FIG. 5C illustrates an example process 580 for using automated evaluation and selection of machine translation protocols, in accordance with one or more example embodiments of the present disclosure.

At step 582, a system (e.g., the remote computing network 106 of FIG. 1, the remote computing network 210 of FIG. 2) may receive a request to translate content (e.g., source content such as the content to be translated 216 of FIG. 2) from a first language to a second language (e.g., a language pair). The request may include the content and the language pair, or the system may identify the initial language (e.g., the first language) based on analysis of the content, including word or phrase recognition, image analysis, and the like. The content may be of a particular type (e.g., legal, marketing, technical, document, image, video, advertisement/promotion, etc.).

At block 583, the system may determine that no matching previously translated content exists (e.g., as described with respect to block 304 of FIG. 3, block 504 of FIG. 5A, block 554 of FIG. 5B). When a matching translation exists, the system may use the matching translation as the output. Otherwise, the system may proceed to block 584.

At block 584, the system may translate the content to the second language using one or more machine translation techniques as described above. When the language pair has a threshold amount of sample translations from past translations, the translation may be a machine translation. When the language pair has never been used, a human translation may be performed and used as ground truth in training one or more ML models (e.g., the one or more ML modules 238 of FIG. 2).

Block 586, block 588, block 590, block 592, and block 594 may provide ways of determining one or more attributes of the first content (e.g., corresponding to block 312 of FIG. 3). At block 586, the system may determine a number of words and/or sentences in the content. The system may determine how long the content is, and how long the first content may require to analyze and translate. The system may analyze text of the first content if the first content is in a document or if the first content is submitted text. The system may analyze images and/or video to extract words using image analysis techniques with object detection, for example. Once words are identified, the system may determine how many words are in or represented by the first content.

At block 588, the system may determine keywords or phrases in the content by analyzing text of the content and/or performing image analysis to extract text from images/video. At block 590, the system may perform image analysis of the content if the content includes an image. Image analysis techniques may include one or more of object/textual recognition algorithms, including scale-invariant feature transform, deep neural networks, convolution neural networks, support vector machine, histogram of oriented gradients, combinations thereof, or the like. At block 592, using words or objects detected by image analysis, the system may identify products, brands, product types, or other characteristics of the content. At block 594, the system may identify received product reviews for products, product types, and/or brands matching the identified products, brands, and/or product types from the textual and/or image analysis (e.g., using matching identifiers of products, product types, and/or brands).

At block 596, the system may determine attributes associated with the content based on the length of the content, identified words or phrases, identified text or objects in an image, product data, or some other information related to the content. The attributes may be used in block 310 of FIG. 3, block 510 of FIG. 5A, and block 560 of FIG. 5B.

The example embodiments described above are not meant to be limiting.

Figure 6:
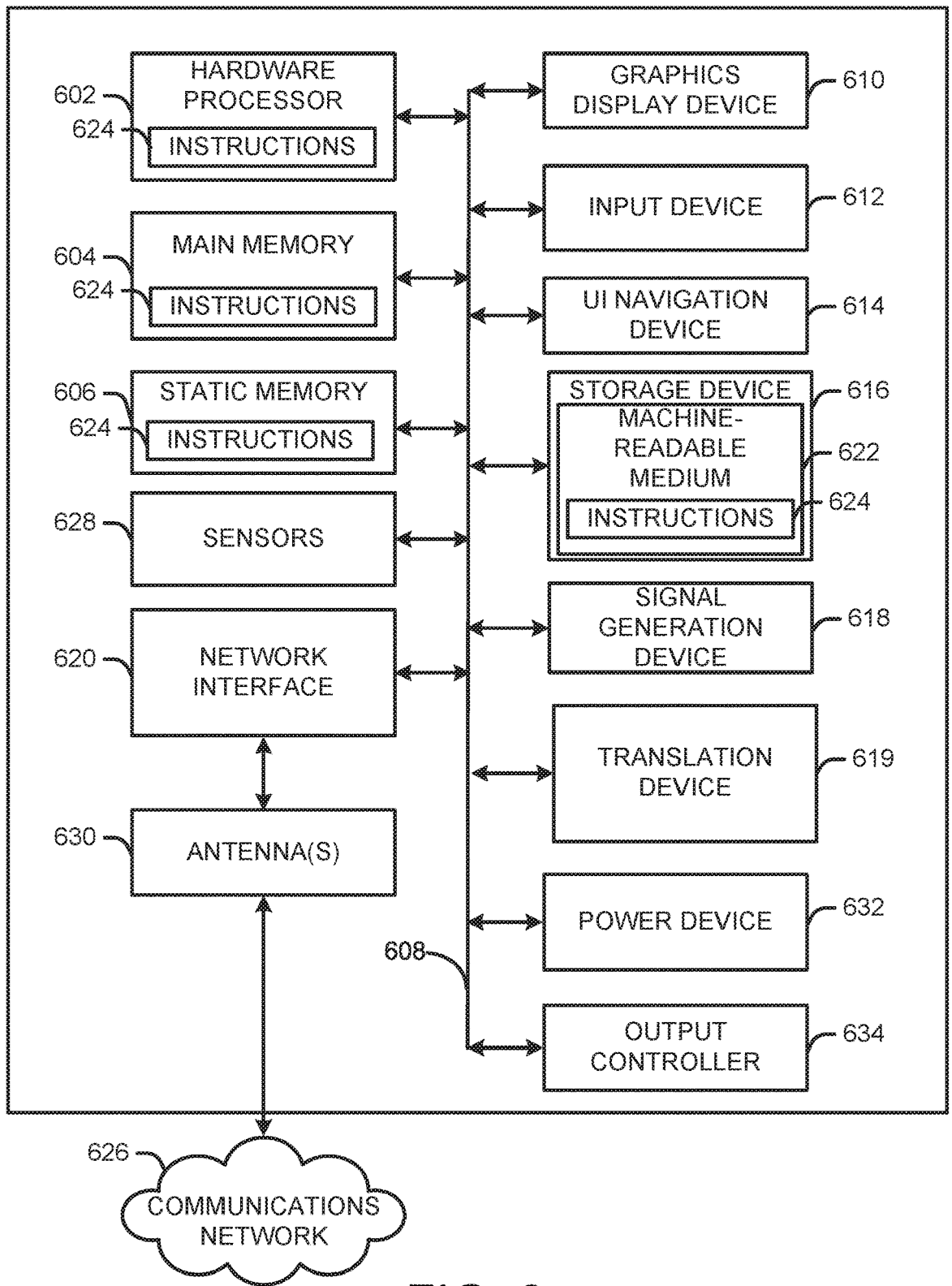
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., implemented in whole or in part by the user device 102 of FIG. 1, the user device 104 of FIG. 1, the remote computing network 106 of FIG. 1, the one or more devices of FIG. 2, the remote computing network 210 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a translation device 619, a network interface device/transceiver 620 coupled to antenna(s) 630, and one or more sensors 628. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The translation device 619 may carry out or perform any of the operations and processes (e.g., process 300 of FIG. 3, process 400 of FIG. 4, process 500 of FIG. 5A, process 550 of FIG. 5B, process 580 of FIG. 5C) described and shown above.

In one or more embodiments, the translation device 619 may be implemented as a user device or server (e.g., the user device 102 of FIG. 1, the user device 104 of FIG. 1, the one or more devices 202 of FIG. 2) used to request a content translation using a language pair, to provide attributes of the content, to provide selections of matching content, to provide product feedback or other product data, and the like.

In one or more embodiments, the translation device 619 may be implemented as a remote computer providing access to remote computer resources (e.g., the remote computing network 106 of FIG. 1, the remote computer network 210 of FIG. 2). The translation device 619 may receive and process translation requests by identifying source content provided for translation, language pairs (e.g., an intended language to which to translate the source content from a source language), matching translations (e.g., matching previously translated content), attributes, content type, product data, and the like. The translation device 619 may predict a translation quality of a machine translation before or after the content is translated using one or more machine translation protocols (e.g., based on a translation quality score), and may consider the predicted translation quality as a basis for selecting a translation protocol or mode used to perform the translation. The translation protocol or mode may define the levels of machine-based translation and/or human operator-based translation. For example, a machine-based translation which may be considered reliable may be allowed to execute without human operator review, but a machine-based translation which may not be considered reliable may use a hybrid translation model in which a human operator may be called upon to review the machine translation. To determine whether a machine translation is likely to be accurate, the translation device 619 may identify previously translated content sharing one or more attributes with the machine translation of the first content from the first language to the second language, and may determine whether the previously translated (e.g., similar) content has a translation score high enough to indicate that the machine translation of the first content also is likely to be reliable (e.g., also have a high translation score).

In one or more embodiments, the translation device 619 may determine a translation quality score threshold based on attributes such as a type of content (e.g., a document type—legal, marketing, etc., an advertisement, a headline), words or phrases in content (e.g., content with cultural references, colloquialisms, terms of art, play on words, etc.), images with overlaying text (e.g., difficult to identify and translate), videos without subtitles (e.g., not subtitles available for use in translation), length of content (e.g., number of sentences or words), keywords, brand names, customer sentiments regarding the content or a related brand, a category of a product represented by the content, and the like. When a translation score indicates that a machine-based translation is likely to be accurate and reliable (e.g., when a translation score exceeds one or more threshold scores), a purely machine-based translation may be used without requiring human operator review. When a translation score indicates that a machine-based translation is unlikely to be accurate and reliable (e.g., when a translation score fails to exceed one or more threshold scores), the machine-based translation may require some level of human operator review. For example, the type and level of human operator review may be based on the translation score (e.g., multiple operator reviews, reviews for grammar or spelling only, review for particular localized or technical words or phrases, etc.).

In one or more embodiments, the translation device 619 may determine when a machine-based translation requires human operator review, and to what degree. The translation device 619 may build a translation memory to store commonly used terms, phrases, re-used content, etc. When the translation device 619 receives a request for a content translation from a first language to a second language (or to multiple other languages), the translation device 619 may access the translation memory to determine if the same or similar content has been translated from the first language to the second language. When a translation in the translation memory matches (e.g., uses all of the same words or phrases) content to be translated, the existing translation from the translation memory may be used (e.g., may serve as the output). When content to be translated does not have a match in the translation memory, the translation device 619 may select a machine translation protocol, translate the first content, and evaluate the machine translation of the content for the likelihood that a computer-based translation will be accurate and reliable based on whether previously translated content shares any attributes with the machine translation and has a sufficiently high translation score.

In one or more embodiments, when the translation device 619 is to translate content, the translation device 619 may determine whether any matching content in the translation memory is reliable enough to use for the translation. For example, matching content in the translation memory having a score exceeding a score threshold may be reliable to use in a machine-based translation. Matching content in the translation memory having a score below a score threshold may not be reliable to use in a machine-based translation, thereby triggering a full translation using any combination of machine-based translation and human-based translation based on attributes of the content to be translated. The thresholds may be adjusted based on whether the results were positive or negative. For example, when a machine translation is selected from the translation memory and proves to be accurate (e.g., the translation score of a review of the translated content is higher than a score threshold), the threshold score may be adjusted lower. When a machine translation is selected from the translation memory and proves to be inaccurate (e.g., the translation score of a review of the translated content is lower than a score threshold), the threshold score may be adjusted higher. Thresholds also may be based on the type of content. For example, technical or legal content may require higher scrutiny than other types of content, so some content types may use a higher score threshold to ensure that only high-quality translations are used. Shorter content may be more likely to meet a quality threshold, so a threshold may be set higher or lower based on the length of content to be translated and/or the matching content.

In one or more embodiments, to build the translation memory and evaluate the quality of machine-based translations, the translation device 619 may perform computer-based evaluations of machine translations using one or more metrics (e.g., WER, BLEU, METEOR, etc.). The metrics may evaluate the differences between machine translation text and reference text in the target (e.g., requested translation) language. The reference text may be selected from the translation memory when the reference text has a high enough quality score. The machine quality score and/or the TER score may be used in any combination to provide one or more scores regarding the quality of translated content in the translation memory.

In one or more embodiments, after machine translation has been performed, the translation device 619 may select the translation mode or protocol indicative of an amount and/or type of human operator review. When the translation device 619 determines that the machine translation is likely to be accurate, the computer system may select a translation mode or protocol that does not require human operator review. When the translation device 619 determines that the machine translation is unlikely to be accurate, the computer system may select a translation mode that requires some level or type of human operator review.

In one or more embodiments, the translation device 619 may receive feedback from content providers, content viewers, or other parties indicating the quality of a translation. The quality score of translated content stored in the translation memory may be based on the feedback provided by one or more parties.

It is understood that the above are only a subset of what the translation device 619 may be configured to perform and that other functions included throughout this disclosure may also be performed by the translation device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   receiving, by at least one processor coupled to memory, a request associated with translating first content from a first language to a second language;
   determining, by the at least one processor, a translation of the first content from the first language to the second language;
   determining, by the at least one processor, an attribute associated with the translation of the first content from the first language to the second language;
   determining, by the at least one processor, based on the attribute, a first estimated time to translate the first content from the first language to the second language using a first machine translation protocol;
   determining, by the at least one processor, based on the attribute, a second estimated time to translate the first content from the first language to the second language using a second machine translation protocol;
   determining that the first estimated time is less than the second estimated time;
   selecting, by the at least one processor and based on the first estimated time being less than the second estimated time, the first machine translation protocol; and
   executing the first machine translation protocol.

2. The method of claim 1, wherein executing the first machine translation protocol comprises:
   sending a request associated with a human operator review of the translation; and
   receiving a modified version of the translation.

3. The method of claim 1, wherein executing the first machine translation protocol comprises sending the translation, and wherein the first machine translation protocol comprises a machine-only translation protocol.

4. The method of claim 1, further comprising:
   determining, based on the attribute, a score threshold;
   generating a translation score associated with second content previously translated from the first language to the second language and associated with the attribute, and wherein the translation score is indicative of a machine translation accuracy; and
   comparing the translation score to the score threshold, wherein selecting the first machine translation protocol is further based on the comparison.

5. The method of claim 1, further comprising:
   determining, based on the attribute, a first estimated accuracy associated with a first human operator review;
   determining, based on the attribute, a second estimated accuracy associated with a second human operator review; and
   determining that the first estimated accuracy is greater than the second estimated accuracy, wherein the first machine translation protocol comprises the first human operator review.

6. The method of claim 1, further comprising:
   determining, based on the attribute, a first estimated cost to translate the first content from the first language to the second language using a first machine translation protocol;

determining, based on the attribute, a second estimated cost to translate the first content from the first language to the second language using a second machine translation protocol; and determining that the first estimated cost is less than the second estimated cost, wherein selecting the first machine translation protocol is further based on the first estimated cost being less than the second estimated cost.

7. The method of claim 1, further comprising:

determining, based on the attribute, a product associated with the first content;

determining an identifier associated with the product;

determining, based on the identifier, that second content previously translated from the first language to the second language is associated with the product; and determining that the second content is associated with the attribute.

8. The method of claim 1, further comprising:

determining a type of content associated with the first content; and determining that second content previously translated from the first language to the second language is associated with the type of content.

9. The method of claim 1, wherein the attribute is based on a number of words in the first content.

10. The method of claim 1, further comprising receiving a product review, wherein the attribute is associated with the product review.

11. The method of claim 1, further comprising generating a first translation score associated with second content previously translated from the first language to the second language and associated with the attribute, wherein the first translation score is indicative of a machine translation accuracy, wherein the first translation score is based on a human operator review of the second content in the second language, further comprising determining a second translation score associated with the second content, wherein the second translation score is based on a computer-based evaluation of the second content in the second language, and wherein selecting the first machine translation protocol is further based on the second translation score.

12. The method of claim 1, further comprising generating a first translation score associated with second content previously translated from the first language to the second language and associated with the attribute, and wherein the first translation score is indicative of a machine translation accuracy;

determining a second translation score associated with the translation of the first content from the first language to the second language; and determining, based on the second translation score, an adjustment associated with the first translation score.

13. The method of claim 1, wherein the request is a first request, wherein the attribute is a first attribute, and wherein the translation is a first translation, further comprising:

receiving a second request associated with translating third content from the first language to the second language;

determining a second translation of the third content from the first language to the second language using the second machine translation protocol;

determining a second attribute associated with the second translation;

determining an absence of content associated with the second attribute; and executing the second machine translation protocol, wherein the second machine translation protocol comprises a human operator evaluation of the second translation.

14. A system comprising memory and at least one processor, the at least one processor configured to:

receive a request associated with translating first content from a first language to a second language;

determine a translation of the first content from the first language to the second language;

determine an attribute associated with the translation;

determine, based on the attribute, a first estimated cost to translate the first content from the first language to the second language using a first machine translation protocol;

determine, based on the attribute, a second estimated cost to translate the first content from the first language to the second language using a second machine translation protocol; and determine that the first estimated cost is less than the second estimated cost;

select, based on the first estimated cost being less than the second estimated cost, the first machine translation protocol; and execute the first machine translation protocol.

15. The system of claim 14, wherein to execute the first machine translation protocol comprises the at least one processor being further configured to:

send a request associated with a human operator review of the translation; and receive a modified version of the translation.

16. A method, comprising:

receiving, by at least one processor coupled to memory, a request associated with translating first content from a first language to a second language;

determining, by the at least one processor, a translation of the first content from the first language to the second language;

determining, by the at least one processor, an attribute associated with the translation of the first content from the first language to the second language;

determining, by the at least one processor, based on the attribute, a first estimated accuracy associated with a first human operator review;

determining, by the at least one processor, based on the attribute, a second estimated accuracy associated with a second human operator review;

determining that the first estimated accuracy is greater than the second estimated accuracy;

selecting, by the at least one processor and based on the first estimated accuracy being greater than the second estimated accuracy, a first machine translation protocol comprising the first human operator review; and executing the first machine translation protocol.

17. The method of claim 16, wherein executing the first machine translation protocol comprises:

sending a request associated with the first human operator review of the translation; and receiving a modified version of the translation.

18. The method of claim 16, further comprising:

determining, based on the attribute, a score threshold;

generating a translation score associated with second content previously translated from the first language to the second language and associated with the attribute, and wherein the translation score is indicative of a machine translation accuracy; and comparing the translation score to the score threshold, wherein selecting the first machine translation protocol is further based on the comparison.

19. The method of claim 16, further comprising:

determining, based on the attribute, a first estimated cost to translate the first content from the first language to the second language using a first machine translation protocol;

determining, based on the attribute, a second estimated cost to translate the first content from the first language to the second language using a second machine translation protocol; and determining that the first estimated cost is less than the second estimated cost, wherein selecting the first machine translation protocol is further based on the first estimated cost being less than the second estimated cost.

20. The method of claim 16, wherein the attribute is based on a number of words in the first content.

* * * * *